US009802068B2

(12) United States Patent
Hermes et al.

(10) Patent No.: US 9,802,068 B2
(45) Date of Patent: Oct. 31, 2017

(54) CLIMBING LOCKING SYSTEM FOR VERTICAL LADDERS (71) Applicants: Logaer Maschinenbau GmbH, Leer (DE); Wobben Properties GmbH, Aurich (DE)

(72) Inventors: Arthur Hermes, Grossefehn (DE); Simon Roth, Wiesmoor (DE)

(73) Assignees: WOBBEN PROPERTIES GMBH, Aurich (DE); LOGAER MASCHINENBAU GMBH, Leer (DE)

( * ) Notice: Subject to any disclaimer, the term of this patent is extended or adjusted under 35 U.S.C. 154(b) by 0 days.

(21) Appl. No.: 14/386,665

(22) PCT Filed: Mar. 20, 2013

(86) PCT No.: PCT/EP2013/055850
§ 371 (c)(1),
(2) Date: Sep. 19, 2014

(87) PCT Pub. No.: WO2013/139865
PCT Pub. Date: Sep. 26, 2013

(65) Prior Publication Data
US 2015/0047925 A1 Feb. 19, 2015

(30) Foreign Application Priority Data
Mar. 22, 2012 (DE) .......... 10 2012 204 643

(51) Int. Cl.
*E06C 7/18* (2006.01)
*A62B 35/00* (2006.01)
(Continued)

(52) U.S. Cl.
CPC ...... *A62B 35/0087* (2013.01); *A62B 35/0062* (2013.01); *E06C 1/381* (2013.01);
(Continued)

(58) Field of Classification Search
CPC . E06C 7/187; E06C 7/50; E06C 7/186; E06C 1/381; E06C 9/00; E06C 9/02;
(Continued)

(56) References Cited

U.S. PATENT DOCUMENTS 2,616,609 A * 11/1952 Herod .................. E06C 7/187
182/8
3,196,990 A 7/1965 Handley
(Continued)

FOREIGN PATENT DOCUMENTS

DE 8811779 U1 12/1988
DE 295 20 679 U1 4/1996
(Continued)

*Primary Examiner* — Katherine Mitchell
*Assistant Examiner* — Shiref Mekhaeil
(74) *Attorney, Agent, or Firm* — Seed Intellectual Property Law Group LLP (57) ABSTRACT There is provided a climbing locking system for climbing ladders in particular of a wind power installation. The climbing locking system has at least one climbing ladder segment having a longitudinal direction and at least one open end for accommodating a fall arrester which can move back and forth as a climbing protection system along the longitudinal direction. The climbing locking system also has at least one climbing locking unit at the at least one open end of the climbing ladder segment. The climbing locking unit is fastened pivotably to the climbing ladder segment and has a locking position for locking a movement of a fall arrester along a direction of the climbing ladder segment and a passing position for allowing a movement of the fall arrester along the longitudinal direction of the climbing ladder segment in both directions.

6 Claims, 6 Drawing Sheets (51) Int. Cl.
*E06C 1/38* (2006.01)
*E06C 9/02* (2006.01)
*E06C 7/50* (2006.01)

(52) U.S. Cl.
CPC ............... *E06C 7/187* (2013.01); *E06C 7/50* (2013.01); *E06C 9/02* (2013.01)

(58) Field of Classification Search
CPC ............ A62B 35/0087; A62B 35/0062; A62B 35/005; A62B 35/0081
USPC ........................................................ 182/129
See application file for complete search history.

(56) References Cited

U.S. PATENT DOCUMENTS

| | | | | |
|---|---|---|---|---|
| 3,348,632 A * | 10/1967 | Swager | .................. | A62B 35/04 182/230 |
| 3,674,116 A * | 7/1972 | Vogeli | ..................... | E06C 7/187 182/192 |
| 3,885,647 A * | 5/1975 | Acosta | ..................... | E06C 7/187 182/146 |
| 4,085,818 A * | 4/1978 | Swager | .................. | E06C 7/187 182/137 |
| 4,111,280 A * | 9/1978 | Devine | ................... | E06C 7/187 182/8 |
| 6,260,662 B1 * | 7/2001 | Meister | ................... | E06C 1/381 182/106 |
| 6,725,969 B1 * | 4/2004 | Meister | .............. | A62B 35/0081 182/3 |
| 2003/0217887 A1 * | 11/2003 | Thomas | ................... | A62B 1/14 182/8 |
| 2006/0283662 A1 * | 12/2006 | Martin | ..................... | A62B 1/14 182/8 |
| 2008/0230311 A1 * | 9/2008 | Fusco | ................. | A62B 35/0062 182/37 |
| 2009/0084630 A1 * | 4/2009 | Argoud | .................... | A62B 1/14 182/192 |
| 2010/0012424 A1 * | 1/2010 | Krauss | ..................... | A62B 1/14 182/3 |
| 2010/0044151 A1 * | 2/2010 | Vollenweider | .......... | E06C 7/187 182/8 |
| 2011/0011678 A1 * | 1/2011 | Sheffield | ................... | E04G 1/24 182/141 |
| 2012/0247869 A1 * | 10/2012 | Anderson | ................. | E06C 9/02 182/8 |
| 2013/0119332 A1 * | 5/2013 | Cantoni | ..................... | B66F 1/08 254/93 R |
| 2015/0129357 A1 * | 5/2015 | Roth | .................. | A62B 35/0093 182/5 |

FOREIGN PATENT DOCUMENTS

| | | |
|---|---|---|
| DE | 197 01 076 C1 | 7/1998 |
| DE | 20 2006 017 158 U1 | 1/2008 |
| DE | 20 2009 008 336 U1 | 10/2009 |
| DE | 20 2009 015 227 U1 | 4/2010 |
| JP | H5567746 U | 5/1980 |
| JP | 2002364279 A | 12/2002 |
| JP | 2006104969 A | 4/2006 |
| RU | 2007342 C1 | 2/1994 |
| RU | 2280137 C2 | 7/2006 |
| RU | 2327056 C2 | 6/2008 |
| WO | 97/24506 A1 | 7/1997 |

* cited by examiner

CLIMBING LOCKING SYSTEM FOR VERTICAL LADDERS

BACKGROUND

Technical Field

The present invention concerns a climbing locking system in particular for fixed climbing ladders with finished guide means.

Description of the Related Art

Climbing ladders for example with a C-shaped central bar as a fixed guide means and a plurality of rungs or steps are used for example in pylons of wind power installations. The C-shaped central bar serves to accommodate a sliding carriage to which a safety belt or body harness can be fixed. The climbing ladders typically comprise a plurality of climbing ladder segments and a plurality of rungs.

The assembly of a pylon of a wind power installation typically involves placing a large number of pylon segment finished parts one upon the other. Those pylon segment finished parts typically have at least one pre-assembled climbing ladder segment. When one pylon segment is placed upon another then the climbing ladder segments also have to be joined together. If however the pylon of a wind power installation is not yet completely constructed then it can happen that a pylon segment has a climbing ladder segment which is not yet fixed to the climbing ladder segment of a pylon segment to be assembled thereabove. In such a case the upper end of the climbing ladder segment is open. Suitable countermeasures have to be adopted to safeguard the open end of a climbing ladder segment.

The following documents were searched in the German patent application from which priority is claimed: DE 197 01 076 C1, DE 295 20 679 U1, DE 88 11 779 U1 and DE 20 2006 017 158 U1.

BRIEF SUMMARY

One or more embodiments of the present invention are directed to a climbing locking system with a climbing locking system which prevents effective safeguarding of an open end of a climbing ladder segment in each assembly condition.

One embodiment includes a climbing locking system for climbing ladders in particular of a wind power installation. The climbing locking system has at least one climbing ladder segment having a longitudinal direction and at least one open end for accommodating a fall arrester which can move back and forth as a climbing protection system along the longitudinal direction. The climbing locking system also has at least one climbing locking unit at the at least one open end of the climbing ladder segment. The climbing locking unit is fastened pivotably to the climbing ladder segment and has a locking position for locking a movement of a fall arrester along a direction of the climbing ladder segment and a passing position for allowing a movement of the fall arrester along the longitudinal direction of the climbing ladder segment in both directions.

In an aspect of the present invention the climbing locking system has a climbing locking unit having a holder which is fixed to the climbing ladder segment, and a locking pin. The locking pin locks the climbing ladder segment in a locking position at least in one direction and in the passing position permits a movement of the fall arrester in two directions.

In a further aspect of the invention the climbing locking system has a climbing locking unit having at least one block for receiving a pivot pin. The climbing locking unit is pivotable by the pivot pin.

In a further aspect the climbing locking unit has a locking point such that the climbing locking unit drops into the locking position without an external action thereof.

In a further aspect of the invention the climbing locking system has a deactivation unit for engaging into the climbing locking unit and for holding the climbing locking unit in the passing position.

The deactivation unit can hold a climbing locking unit of a first and a second climbing ladder segment in the passing position.

According to one embodiment there is provided a climbing locking system having a deactivatable climbing locking means. The deactivatable climbing locking means is preferably fixed to an (open) end of a climbing ladder segment preferably in the preliminary assembly procedure or ex works. The deactivatable climbing locking means can be provided at top and bottom at the open climbing ladder ends. Preferably a moving carriage or a fall arrester or a guided fall arrester for a fall arrester (for example in accordance with EN 353-1) can be guided in one direction in barrier-free fashion by the climbing locking means (downwardly or upwardly) while in the opposite direction (upwardly or downwardly) however the fall arrester is stopped. The deactivatable climbing locking means can be deactivated only after intentional resetting of a climbing locking means or locking pawl so that a fall arrester is moved upwardly (or downwardly) out of the open end of the climbing ladder segment. At that time an assembly operative should already have secured himself at another location.

In an aspect of the present invention the climbing locking system has a deactivation unit which, for example when the free end of a climbing ladder segment has been joined to another climbing ladder segment and the climbing locking means at that junction location are no longer required, is connected to both climbing locking means or locking pawls so that the two locking pawls are held in a deactivated condition. The deactivation unit is so installed that release of the connection between the climbing ladder segments is possible only after reactivation of the climbing locking means.

According to one embodiment the climbing locking system has at least one pivotable locking pawl. The pivotable locking pawl has a center of gravity such that the locking pawl in the normal operative position provides for locking of a moveable carriage of a fall arrester in one direction. To deactivate the locking pawl the locking pawl must be pivoted in a second operative condition.

One embodiment of invention also concerns a pylon segment of a wind power installation pylon having a climbing locking system as described hereinbefore and a wind power installation having a pylon with at least one pylon segment as described hereinbefore.

Further configurations of the invention are subject-matter of the appendant claims.

BRIEF DESCRIPTION OF THE SEVERAL VIEWS OF THE DRAWINGS

Advantages and embodiments by way of example of the invention are described in greater detail hereinafter with reference to the drawing.

FIG. 4C shows a perspective view of a portion of a climbing ladder segment with a climbing locking system according to the second embodiment, FIGS. 5A and 5B respectively show a perspective view of a climbing locking system according to the third embodiment, FIG. 5C shows a portion of a climbing ladder segment with a climbing locking system according to the third embodiment.

DETAILED DESCRIPTION

The climbing ladder with the climbing locking system according to one or more embodiments of the invention is used for example in pylons of wind power installations. Typically the climbing ladders comprise a plurality of climbing ladder segments which are preferably already fixed to segments of a pylon of a wind power installation in the preliminary assembly procedure.

Figure 1:
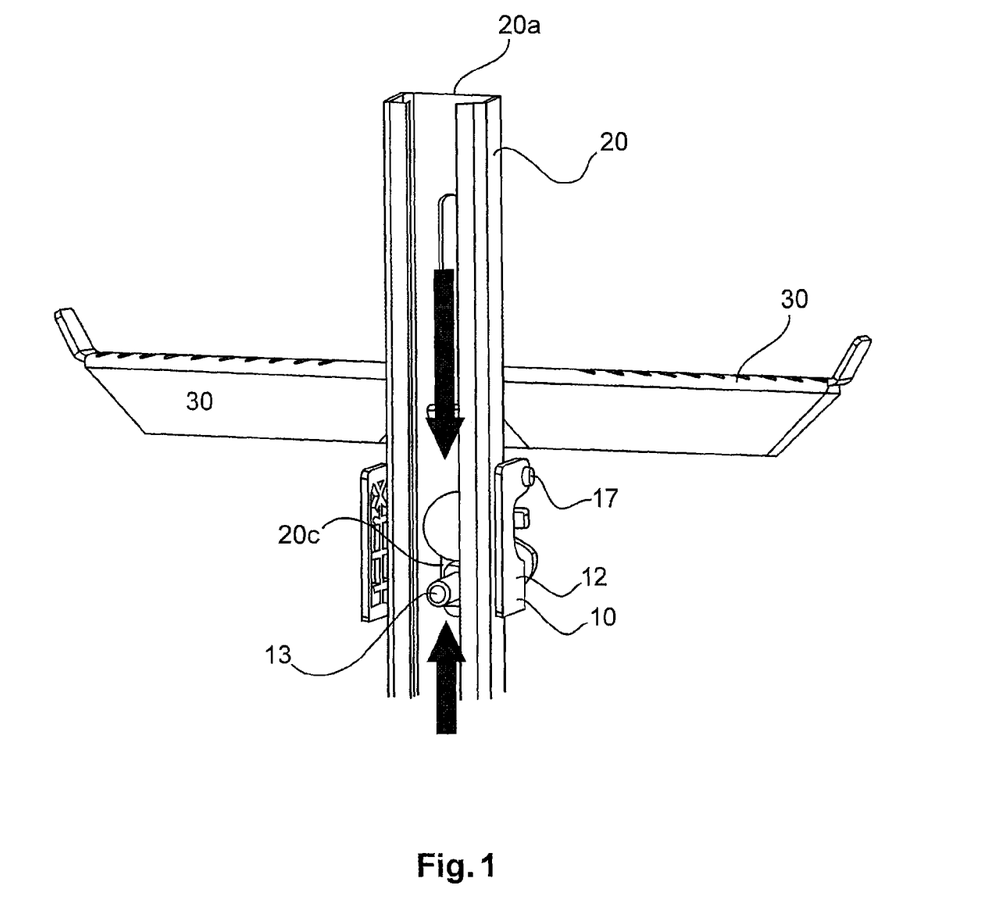
FIG. 1 shows a perspective view of a portion of a climbing ladder segment with a climbing ladder protection system according to a first embodiment.

FIG. 1 shows a perspective view of a portion of a climbing ladder segment with a climbing ladder protection system according to a first embodiment. FIG. 1 shows a climbing ladder segment 20 with a step or a rung 30. The climbing ladder segment 20 has an upwardly open end 20a. The climbing ladder segment 20 is for example in the form of a C-shaped profile member. A moving carriage, a fall arrester, or a guided fall arrester (not shown) can be moved within the C-shaped profile member, for use in conjunction with a fall protection harness. The climbing ladder segment 20, in the region of the upper end 20a, has a slot 20c through which a climbing locking system 10 according to a first embodiment projects into the C-shaped profile member of the climbing ladder segment 20 in such a way that a movement of the carriage of the body harness or a (guided) fall arrester is possible only in one direction (downwardly). A movement of the carriage upwardly is prevented by the climbing locking system. That is intended to ensure in particular that, when constructing a pylon of the wind power installation, assembly operatives who are secured by a body harness and a carriage in the C-shaped profile member of the climbing ladder segment 20 cannot unintentionally remove the carriage out of the open end 20a without in that case being further or additionally secured.

The climbing locking system 10 according to the first embodiment has a rotary pin 17, a holder 12 and a locking pin 13. Provided in the region of the rotary pin 17 is a pivot point so that the holder 12 can be pivoted. In the pivotal movement of the holder 12 the locking pin 13 is moved rearwardly so that the path is cleared for a carriage in an upward direction.

In accordance with the first embodiment a carriage of a body harness can be introduced into the upper end 20a and guided downwardly. The carriage (a guided fall arrester), after it has passed the locking protection system, cannot however be moved upwardly again without unlocking the locking system. To deactivate the climbing locking system the assembly operative has to pivot the holder 12 rearwardly into a passing position so that the locking pin 13 is pivoted out of the C-shaped profile member of the climbing ladder segment 20. Preferably the center of gravity of the holder 12 is such that the locking pin 13 automatically pivots back into the locking position again for example by virtue of the force of gravity without an action thereon by an assembly operative. By virtue of the configuration of the holder 12, optionally a guided fall arrester which has a securing pin cannot be introduced upside-down into the C-shaped profile member.

According to one embodiment of the invention the climbing locking system can have a locking unit for an upper open end and a locking unit for a lower open end.

Figure 2A:
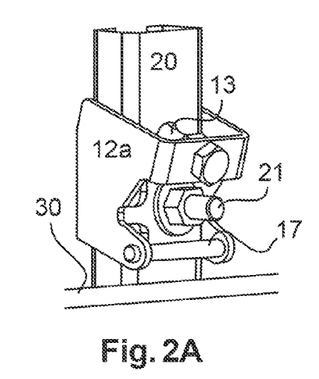
FIGS. 2A to 2C show various views of a portion of a climbing ladder segment with a climbing locking system according to a second embodiment.
Figures 2B, 2C:
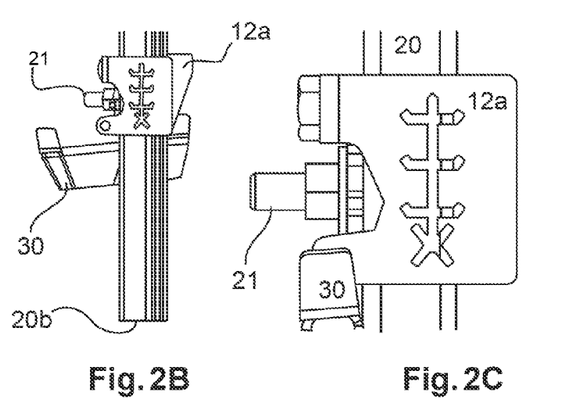

FIGS. 2A to 2C show various views of a portion of a climbing ladder segment with a climbing locking system according to a second embodiment. FIGS. 2A to 2C show in particular a climbing locking unit for a lower open end 20b of a climbing ladder segment. FIGS. 2A to 2C show a climbing ladder segment 20 having a rung or step 30. The climbing locking unit 30 has a holder 12, a pivot pin 17 and a locking pin 13. The climbing locking unit can be fixed to the climbing ladder segment 20 by means of a screw 21. The climbing locking unit can be pivoted between a locking position and a passing position. In that case the pin 17 represents the pivot axis. In the locking position the locking pin 13 engages into the C-shaped profile member so that a moving carriage with the body harness cannot be further moved downwardly. For release purposes the climbing locking unit 10 (locking pawl) is pivoted rearwardly so that the locking pin 13 no longer engages into the C-shaped profile member of the climbing ladder segment. The pivotability of the climbing locking unit provides that a carriage can be moved upwardly but not downwardly. The carriage can be moved downwardly only when the assembly operative intentionally pivots the climbing locking unit. The climbing locking unit is of such a configuration that it preferably drops automatically into the locking position. That can be achieved for example by the implementation of the center of gravity of the climbing locking unit.

Figure 3A:
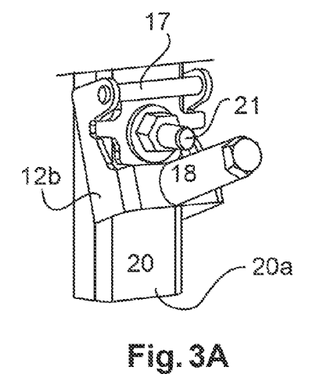
FIGS. 3A to 3C show various views of a portion of a climbing ladder segment with a climbing locking system according to a third embodiment, FIGS. 4A and 4B respectively show various perspective views of a climbing protection system according to the second embodiment.
Figure 3B:
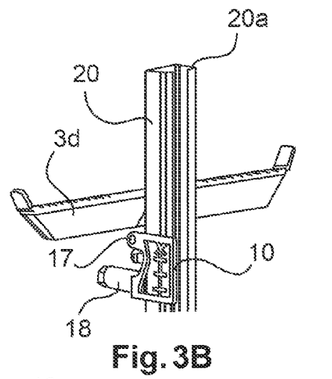
Figure 3C:
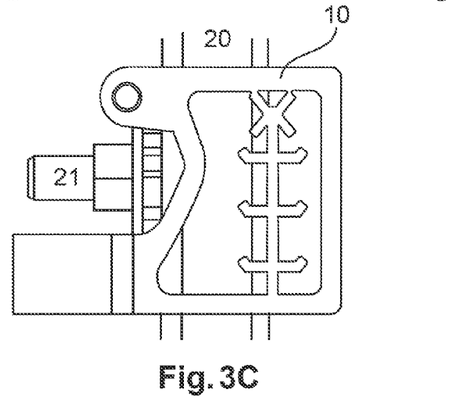

FIGS. 3A to 3C show various views of a portion of a climbing ladder segment with a climbing locking system according to a third embodiment which can be based on the first embodiment. FIGS. 3A to 3C show a climbing locking unit for an upper open end of a climbing ladder segment. While in the case of the climbing locking unit for a lower open end the pivot pin is arranged beneath the locking pin 13, in the case of a locking protection unit for an upper open end the pivot pin 17 is arranged above the locking pin 13. The center of gravity of the locking protection unit for the upper open end 20a is so selected that the holder 12b is in the locking position in the rest position. It is only when the holder 12b is pivoted that the climbing locking unit is unlocked and the carriage can be correspondingly moved within the C-shaped profile member 20.

Thus a carriage of a body harness can be moved readily downwardly but not upwardly.

In the case of the climbing locking unit in FIG. 2A that is precisely reversed, here the carriage (guided fall arrester) of a body harness can be readily moved upwardly but not downwardly as a movement downwardly is blocked by the locking position of the holder 12*a*.

Figure 4A:
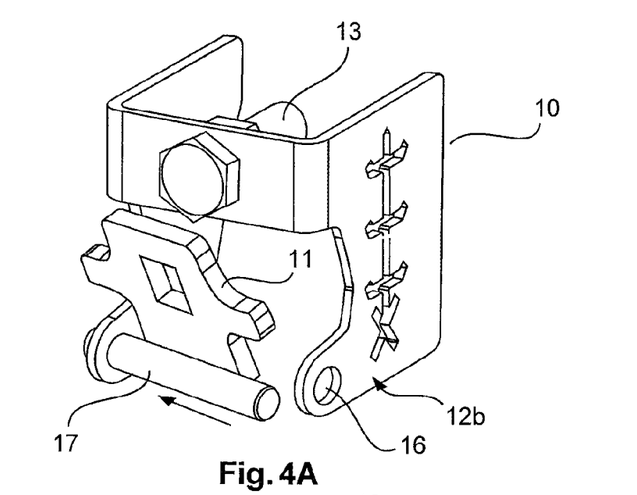
Figures 4B, 4C:
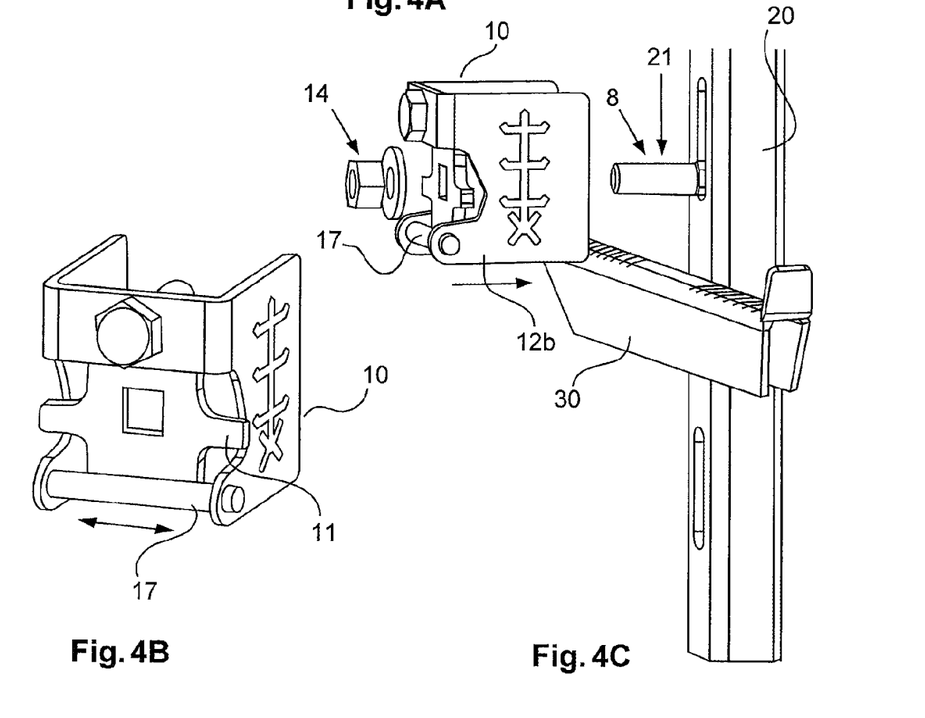

FIGS. 4A, 4B and 4C respectively show various perspective views of a climbing locking system according to the second embodiment. The holder 12*b* is shown in FIGS. 4A and 4B. The holder 12*b* has two mutually opposite holes 16 into which the pivot pin 17 can be introduced, together with the holding plate 11. The holding plate 11 is fixedly secured to the pivot pin 17. The holder 12*b* also has a locking pin 13. The holder can be fixed to the C-shaped profile member 20 by means of the holding plate 11 and a screw 21 so that the holder can be pivoted about the pivot pin 17.

Figures 5A, 5B, 5C:
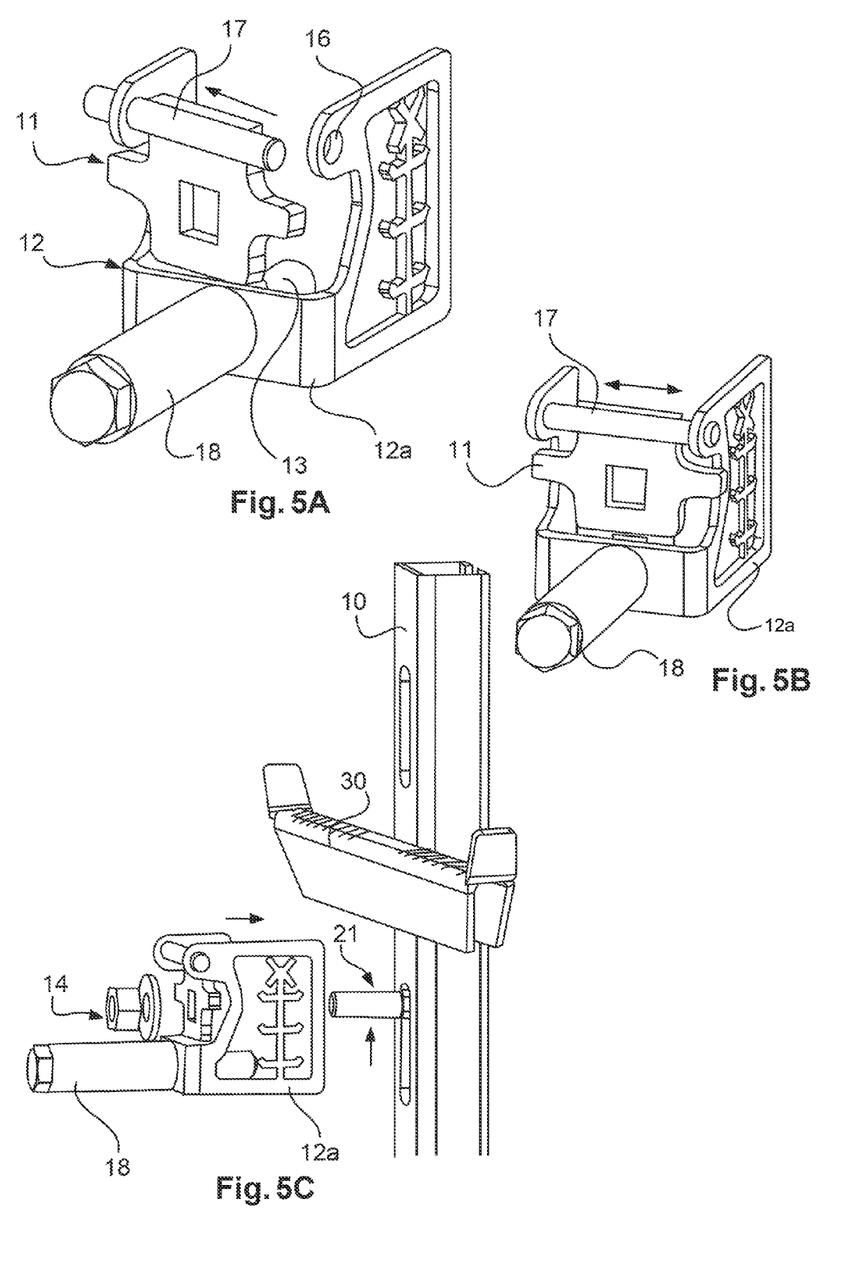

FIGS. 5A, 5B and 5C respectively show a perspective view of a climbing locking system according to the third embodiment which can be based on the first embodiment. The holder 12*a* for a lower open end of a climbing ladder segment is of a substantially corresponding structure to the holder 12*b*. The holder 12*a* has two holes 16 for receiving a pivot pin 17 and a holding plate 11. The holder 12*a* also has a locking pin 13. Optionally the holder 12*a* can have a pin 18 which provides the weight (or counter-weight) for correct positioning of the center of gravity of the locking pawl. The holder can be used for unlocking purposes.

The deactivation system has the appropriate advantage that it permits release of the connection of the climbing ladder segments (20) by the connecting plate (41) and the screws (42) only after removal thereof and re-activation of the locking pawls so that those climbing locking means already exclude, prior to climbing ladder dismantling, endangerment due to the open ends (20) which then occur.

Figure 6:
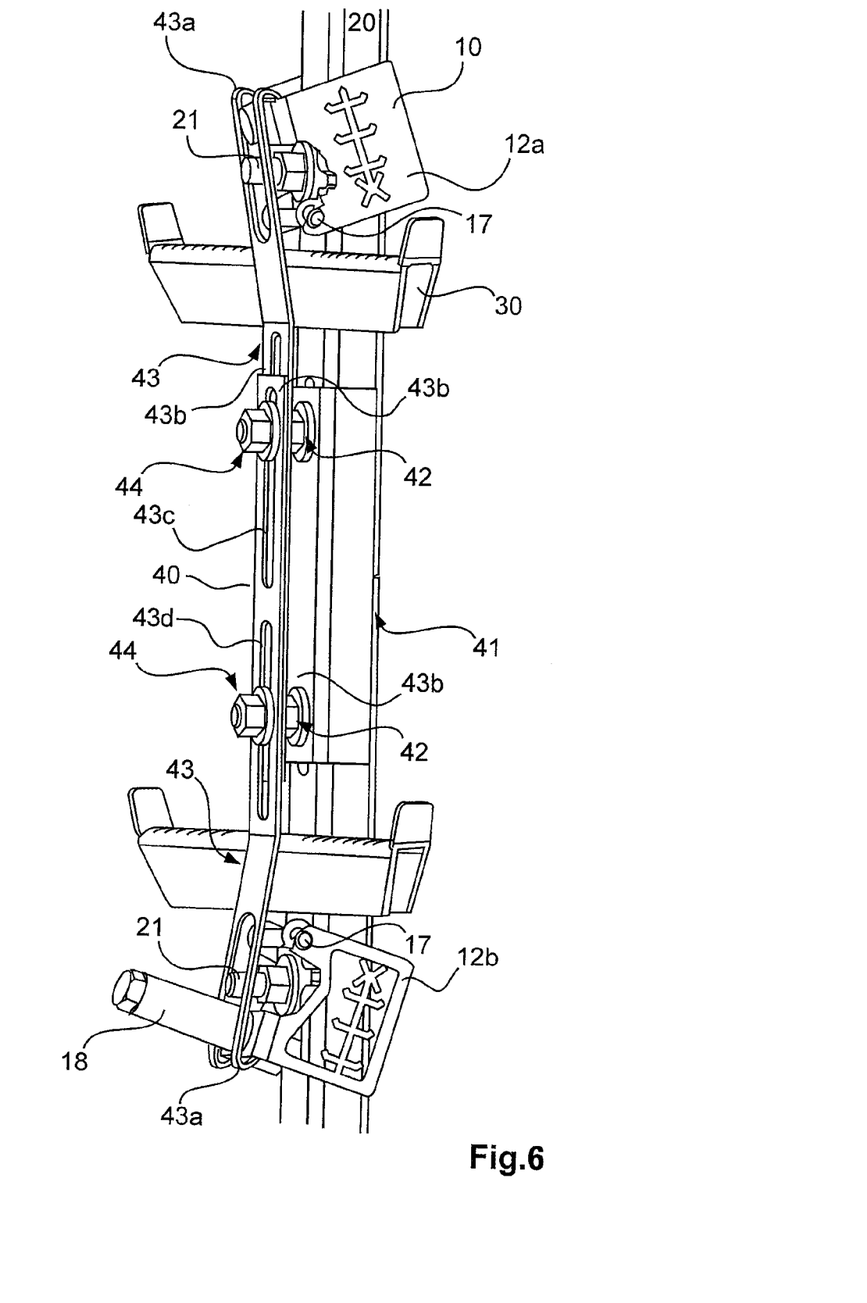
FIG. 6 shows a perspective view of a climbing ladder with two climbing locking systems according to one embodiment.

FIG. 6 shows a perspective view of a climbing ladder with two climbing locking systems according to one embodiment. FIG. 6 shows two climbing ladder segments 20 which are to be fitted into or to each other. As there is now no open end at the climbing ladder segments the climbing locking units are no longer required and are to be permanently deactivated. That is effected by way of a deactivation unit 40. The deactivation unit 40 can comprise for example two plates 43. The plate 43 has a first end 30*a* which is in the form of a hook and can engage into a holder of the climbing locking unit. The plate 43 further has two slots 43*c*, 43*d*.

The two climbing ladder segments 20 can be fixed in each other for example by means of a plate 41. The deactivation unit preferably comprises two plates 43, wherein the hooked ends 43*a* of the plates respectively engage into one of the locking protection units and hold the locking protection unit in an unlocked or deactivated condition. The two plates can then be fixed by means of hexagonal nuts 44.

Release of the plate firstly requires loosening of the nuts 44 so that the climbing locking units are activated again.

Figure 7:
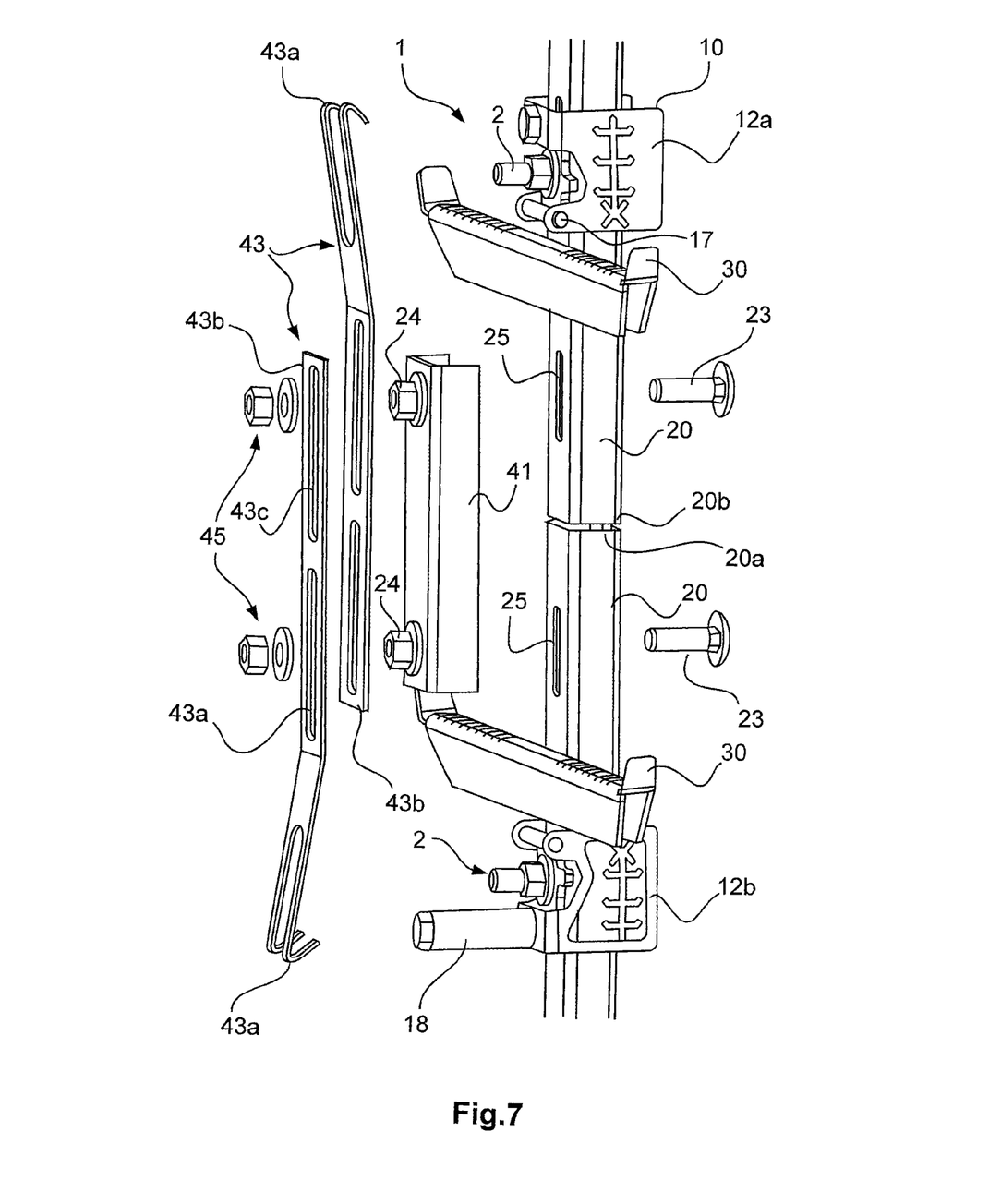
FIG. 7 shows a perspective exploded view of the climbing ladder and two climbing locking systems according to one embodiment.

FIG. 7 shows a perspective exploded view of the climbing ladders and two climbing locking systems according to one embodiment. Two climbing ladder segments 20 are arranged in mutually butting relationship and can be fixed with the plate 41 as well as the screws 23 and the slots 25. The deactivation unit 40 comprising two plates 43 is hooked into the climbing locking units and fixed to the plate in such a way that the two climbing locking units are deactivated.

Thus the climbing locking units do not have to be dismantled after two climbing locking segments are fixedly connected together (upwardly and downwardly) and can be freely passed.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A climbing locking system for climbing ladders, the climbing locking system comprising:
    a climbing ladder segment having a longitudinal direction and at least one open end for receiving a fall arrester that is configured to move back and forth as a climbing protection system along the longitudinal direction;
    a climbing locking unit at the at least one open end of the climbing ladder segment, wherein the climbing locking unit is fastened pivotably to the climbing ladder segment and has a locking position for locking a movement of the fall arrester along one direction of the climbing ladder segment and a passing position for allowing a movement of the fall arrester along the longitudinal direction of the climbing ladder segment in two directions, wherein the climbing locking unit has a center of gravity such that the climbing locking unit engages into the locking position in response to gravitational forces acting thereon; and
    a deactivation unit that engages with the climbing locking unit to hold the climbing locking unit in the passing position.

2. The climbing locking system according to claim 1 wherein the climbing locking unit has:
    a holder that is fixed to the climbing ladder segment; and
    a locking pin, wherein the locking pin locks the climbing ladder segment in the locking position and in the passing position permits the movement of the fall arrester in two directions.

3. The climbing locking system according to claim 1 wherein the climbing locking unit has at least one hole for receiving a pivot pin, wherein the climbing locking unit is pivotable by the pivot pin.

4. A climbing locking system for climbing ladders, the climbing locking system comprising:
    a climbing ladder segment having a longitudinal direction and at least one open end for receiving a fall arrester that is configured to move back and forth as a climbing protection system along the longitudinal direction;
    a climbing locking unit at the at least one open end of the climbing ladder segment, wherein the climbing locking unit is fastened pivotably to the climbing ladder segment and has a locking position for locking a movement of the fall arrester along one direction of the climbing ladder segment and a passing position for allowing a movement of the fall arrester along the longitudinal direction of the climbing ladder segment in two directions, wherein the climbing locking unit has a center of gravity such that the climbing locking unit engages into the locking position in response to gravitational forces acting thereon; and a deactivation unit configured to engage with the climbing locking unit and to hold the climbing locking unit in the passing position, wherein the climbing ladder segment is a first climbing ladder segment and the climbing locking unit is a first climbing locking unit, the climbing locking system further comprising a second climbing ladder segment and a second climbing locking unit at an open end of the second climbing ladder segment, the first and second climbing ladder segments being fitted to each other at respective ends, wherein a first end of the deactivation unit engages into the first climbing locking unit of the first climbing ladder segment and a second end of the deactivation unit engages into the second climbing locking unit of the second climbing ladder segment and holds the first and second climbing locking units in the passing position.

5. A pylon segment of a pylon of a wind power installation comprising:

a climbing locking system including:

a climbing ladder segment having a longitudinal direction and an open end for receiving a fall arrester that is configured to move back and forth as a climbing protection system along the longitudinal direction;

a climbing locking unit at the open end of the climbing ladder segment, wherein the climbing locking unit is fastened pivotably to the climbing ladder segment and has a locking position for locking a movement of the fall arrester along one direction of the climbing ladder segment and a passing position for allowing a movement of the fall arrester along the longitudinal direction of the climbing ladder segment in two directions, wherein the climbing locking unit has a center of gravity such that the climbing locking unit engages into the locking position in response to gravitational forces acting thereon; and a deactivation unit that engages with the climbing locking unit to hold the climbing locking unit in the passing position.

6. A wind power installation having at least one pylon segment according to claim 5.

* * * * *